(12) United States Patent
Philipson

(10) Patent No.: US 7,192,639 B2
(45) Date of Patent: Mar. 20, 2007

(54) CHROMATE FREE CORROSION RESISTANT COATING

(75) Inventor: Joseph Philipson, Pasadena, CA (US)

(73) Assignee: Hi-Shear Corporation, Torrance, CA (US)

( * ) Notice: Subject to any disclaimer, the term of this patent is extended or adjusted under 35 U.S.C. 154(b) by 41 days.

(21) Appl. No.: 10/757,137

(22) Filed: Jan. 14, 2004

(65) Prior Publication Data

US 2005/0151120 A1    Jul. 14, 2005

(51) Int. Cl.
*B32B 15/098* (2006.01)
*B32B 27/20* (2006.01)
*B32B 27/42* (2006.01)

(52) U.S. Cl. .................. 428/330; 428/460; 428/524

(58) Field of Classification Search .......... 428/460, 428/524, 330; 106/14.42, 14.43, 14.44; 524/83; 252/389.3, 389.52, 389.54, 389.61, 391, 252/393, 394, 395, 396

See application file for complete search history.

(56) References Cited

U.S. PATENT DOCUMENTS

| | | | |
|---|---|---|---|
| 3,983,304 A | 9/1976 | Sekhon | |
| 4,294,808 A * | 10/1981 | Wasel-Nielen et al. | 423/305 |
| 5,487,779 A | 1/1996 | Sinko | |
| 5,558,706 A | 9/1996 | Sinko | |
| 5,593,780 A * | 1/1997 | Yap | 428/392 |
| 5,948,147 A | 9/1999 | Sinko | |
| 6,059,867 A | 5/2000 | Lewis et al. | |
| 6,139,610 A | 10/2000 | Sinko | |
| 6,315,300 B1 | 11/2001 | Philipson | |

OTHER PUBLICATIONS

Hawley's Cendensed Chemical Dictionary, 13th Edition, p. 379, Jan. 1999.*
Hi-Shear Corporation, Hi-Kote® 1 brochure, A Protective Coating For Titanium Alloy and Corrosion Resistant Steel Fasteners, 4 pages, dated 1992.
Ciba Specialty Chemicals, Ciba® IRGACOR® 252 FC, "Organic Corrosion Inhibitor", Apr. 1987, pp. 1-3.

* cited by examiner

*Primary Examiner*—Ramsey Zacharia
(74) *Attorney, Agent, or Firm*—Fulwider Patton LLP.

(57) ABSTRACT

The chromate free corrosion resistant coating for a fastener contains corrosion inhibiting inorganic constituents, or a combination of inorganic and organic corrosion inhibiting constituents, suspended in a phenol-formaldehyde thermosetting resin. The coating material possesses high abrasion resistance, and provides good lubricity and relatively low friction, rendering it especially suited for use with interference-fit fasteners.

10 Claims, 2 Drawing Sheets

CHROMATE FREE CORROSION RESISTANT COATING

BACKGROUND OF THE INVENTION

This invention relates to protective coatings and to fasteners coated by them, and more particularly to such coatings and fasteners capable of protecting one or both of two dissimilar metals assembled together, from structural corrosion or deterioration.

The invention is applicable to use with a number of different metals and combinations of metals. It is especially applicable to the coating of titanium. A particular application relates to titanium fasteners commonly used in the aluminum structures of aircraft and the like.

It is common practice to assemble aluminum or aluminum alloy structures, such as those of aircraft, with high strength fasteners of titanium or titanium alloys. It is well-known that galvanic action due to electro-chemical coupling effects present in such assemblies often results in undesirable corrosion of the aluminum or titanium elements, or both. It is known that aluminum has a tendency for galvanically induced corrosive attack in contact with titanium, if wet. Furthermore, the corrosion susceptibility of these structures is increased by harsh saline or acidic environments frequently encountered. When the fasteners are of the interference-fit type such as commonly used in the aircraft industry, the problem is further compounded by the fact that a coating on a fastener must be tough and adherent enough to withstand the force fitting operation. Such coatings must also be held to close tolerances.

A number of expedients have heretofore been proposed to reduce or eliminate such galvanic corrosion, among which have been: plating the fasteners with cadmium or aluminum; substitution of steel for titanium fasteners; coating the fasteners with organic or inorganic coatings; use of wet primers or elastomeric sealants during installation; and coating the fasteners or structural exteriors with paint such as a zinc chromate type. Chemicals including phosphates, molybdates, and silicates of some metals, such as sodium silicate, and zinc salts including zinc molybdate, zinc phosphate, and zinc oxide have also been found to be effective as corrosion inhibitors. Such materials are believed to prevent corrosion by a variety of mechanisms, such as forming an electrically non-conductive molecular layer on the metallic substrate, decreasing the permeability of the coating, forming a chemically resistant compound on the metallic substrate, or making the coating material hydrophobic to thus prevent water-borne corrosive materials to reach the substrate, for example.

The several types of coatings and corrosion inhibitors heretofore used have presented problems such as failing to give complete protection, inadequate toughness or adherence, and excessive expense. Even those most widely used in the aircraft industry, namely cadmium plating, organic and inorganic coatings, and sealants have been less than completely satisfactory. The organic and inorganic type coatings typically act as a physical barrier against salt, moisture and the like without providing substantial corrosion protection. Cadmium plated fasteners and wet installation approaches, although finding considerable success in inhibiting corrosion of aluminum structures, have other undesirable limitations, such as an embrittling effect on titanium and high strength steel in direct contact with cadmium. Wet installation imposes undesirably high cost of assembly and presents production adaptability problems and the like.

Chromates have been widely used for over many years as corrosion inhibitors in corrosion inhibiting coatings such as paints, sealants and caulking compounds. Commonly used corrosion inhibitors in the aerospace industry included alkaline earth and zinc salts of hexavalent chromium, which can also enhance adhesive properties of corrosion inhibiting compositions. However, it is now also generally accepted that such chromates can be toxic, and that the continued usage of chromates in corrosion inhibiting coatings represent health and environment hazards.

One corrosion resistant, protective metal-organic base coating that was developed many years ago for non-aluminum metal fasteners has been used in aluminum structures of aircraft, to counter the bimetallic corrosion that the non-aluminum metal fasteners would otherwise cause. That coating includes a mixture of a powdered metallic substance such as powdered aluminum or molybdenum disulfide with a phenol-formaldehyde resin in a volatile carrier selected from lower alkyl alcohols, such as ethyl alcohol, methyl ethyl ketone and petroleum distillate, such as toluene, together with strontium chromate and zinc chromate.

Another type of non-chromate, corrosion-inhibiting coating composition for metal surfaces includes at least one inhibitor selected from the group consisting of phosphates, phosphosilicates, silicates, and mixtures thereof, with at least one inhibitor being selected from titanates and zinc salts. The composition may also include a borate such as boric acid, and a succinate. A preferred phosphate includes calcium dihydrogen phosphate, and a preferred titanate is sodium titanium oxide. The zinc salt may include zinc phosphate or zinc cyanamide.

Many materials are currently available commercially which provide some corrosion resistant properties to coatings, but none of these materials have been as effective as hexavalent chromium compounds. Other compounds typically offer protection via one mechanism against one aspect of the corrosion process. A need thus still exists for coating formulations that do not contain chromate but that combine useful corrosion resistance properties of different corrosion inhibitors to synergistically achieve an effectiveness substantially equivalent to that of chromate containing coatings in preventing corrosion. The present invention meets these and other needs.

SUMMARY OF THE INVENTION

Briefly, and in general terms, the present invention provides for a fastener with a corrosion resistant coating that does not contain chromate, but that is as effective in preventing corrosion as an equivalent chromate containing coating.

Accordingly, in one embodiment, the present invention provides for a fastener coated with a coating material containing a corrosion resistant composition consisting essentially of approximately 8% by weight of a salt of inorganic constituents formed from cations selected from the group consisting of zinc and calcium, and anions selected from the group consisting of silicates, phosphates, carbonates and oxides, and approximately 8% by weight of 1-(Benzothiazol-2-ylthio) succinic acid, (BTTSA), the chemical formula of which is illustrated in FIG. 3, suspended in a remainder which includes a phenol-formaldehyde thermosetting resin. The remainder may further include a pigment such as molybdenum disulfide, aluminum, polypropylene, or combinations thereof. The corrosion resistant composition typically is dissolved in a volatile solvent carrier, giving the mixture a liquid consistency but providing fast drying after application.

In another embodiment, the invention provides for a fastener coated with a coating material containing a corrosion resistant composition consisting essentially of approximately 4% by weight of a salt of inorganic constituents formed from cations selected from the group consisting of zinc and calcium, and anions selected from the group consisting of silicates, phosphates, carbonates and oxides, approximately 4% by weight of 1-(Benzothiazol-2-ylthio) succinic acid, (BTTSA), and approximately 4% by weight of (2-benzothiazolylthio) succinic acid (BTTSA) amine complex, the chemical formula of which is illustrated in FIG. 4, suspended in a remainder including phenol-formaldehyde thermosetting resin. The remainder may further include a pigment such as molybdenum disulfide, aluminum, polypropylene, or combinations thereof. The corrosion resistant composition typically is dissolved in a volatile solvent carrier, as noted above.

The coating materials of the invention possess high abrasion resistance, and provides good lubricity and relatively low friction, rendering it especially suited for use with interference-fit fasteners. The coating material furthermore is especially adaptable to the application to the metal, such as a fastener, for example rivets, bolts and screws. The coating material is also desirable for use in coating other types of fasteners, such as threaded fasteners, alloy steel parts and high temperature tool steel.

These and other aspects and advantages of the invention will become apparent from the following detailed description and the accompanying drawings, which illustrate by way of example the features of the invention.

DETAILED DESCRIPTION OF THE PREFERRED EMBODIMENTS

Corrosion of fastener assemblies in aircraft due to galvanic action has typically been combated by plating of the fasteners with a corrosion resistant material such as cadmium or aluminum, coating the fasteners with organic or inorganic coatings including phosphates, molybdates, silicates and chromates as corrosion inhibitors, which are typically expensive and often fail to provide complete protection, and adequate toughness and adherence. While chromates have been used as an industry standard as corrosion inhibitors in corrosion inhibiting coatings, such chromates can be toxic, and it is desirable to discontinue the use of chromate based corrosion inhibiting coatings.

Figure 1:
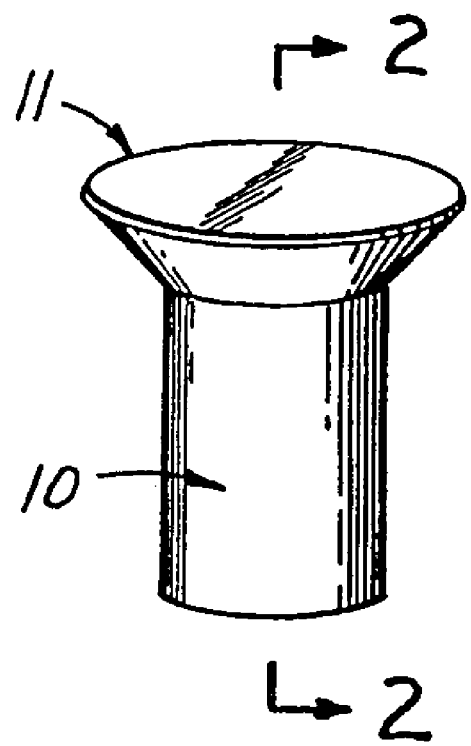
FIG. 1 is an isometric view of a fastener coated by a protective coating according to the invention.
Figure 2:
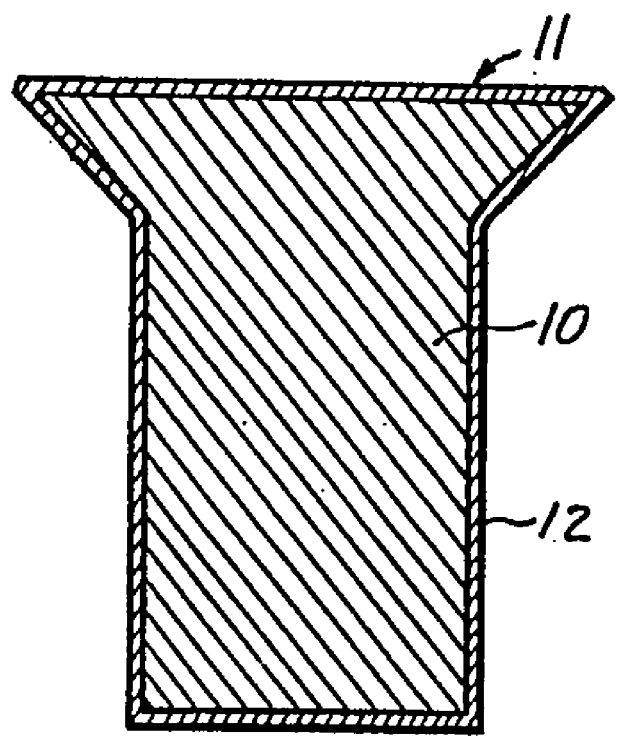
FIG. 2 is a cross-sectional view taken along line 2—2 of FIG. 1.

As is illustrated in the drawings, the invention is embodied in a fastener of the type commonly used in an aircraft frame, such as typical rivet type, for example, having an exterior coating of a corrosion resistant material. Referring to FIGS. 1 and 2, the fastener comprises a shank 10 and a head 11, all of a solid metal, which may be of a type referred to above, and the entire surface of the rivet is coated by a protective, corrosion resistant coating 12 provided according to this invention. The rivet is typically of the interference type so that the diameter of the exterior surface at the coating 12 at the shank is slightly greater than the diameter of the hole of the sheet or other structural material into which it is to be forced, such as by pressing or hammering. This forcing of the rivet into the hole produces great frictional stress on the coating. The corrosion resistant coating should therefore also provide a lubricating effect, so as to counteract this abrasive stress.

Figure 3:
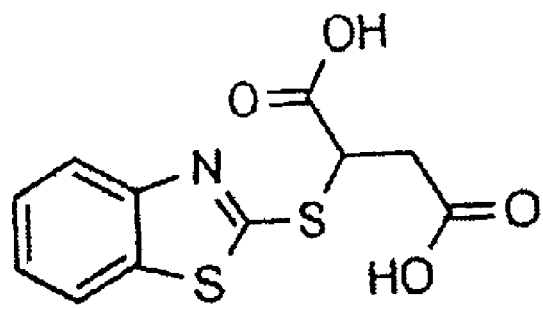
FIG. 3 is an illustration of the chemical formula of 1-(Benzothiazol-2-ylthio) succinic acid.

In a first embodiment, coating mixtures according to this invention useful for the coating of such fasteners contain a corrosion resistant composition consisting essentially of approximately 8% by weight of a salt of inorganic constituents, and approximately 8% by weight of 1-(Benzothiazol-2-ylthio) succinic acid (BTTSA), the chemical formula of which is illustrated in FIG. 3. The inorganic salt component is formed from cations selected from the group consisting of zinc and calcium, and anions selected from the group consisting of silicates, phosphates, carbonates and oxides, and is available from Wayne Pigment Corporation, Milwaukee, Wis., under the trade name Wayncor 204, for example. The BTTSA component is available from CIBA under the trade name IRGACOR 153. These components are suspended in a phenol-formaldehyde thermosetting resin which forms the remainder of the corrosion resistant composition, which may also include other ingredients. The remainder may, for example, further include a pigment such as molybdenum disulfide, aluminum, polypropylene, or combinations thereof. The corrosion resistant composition typically is dissolved or dispersed in a volatile solvent carrier, giving the mixture a liquid consistency but providing fast drying after application.

Figure 4:
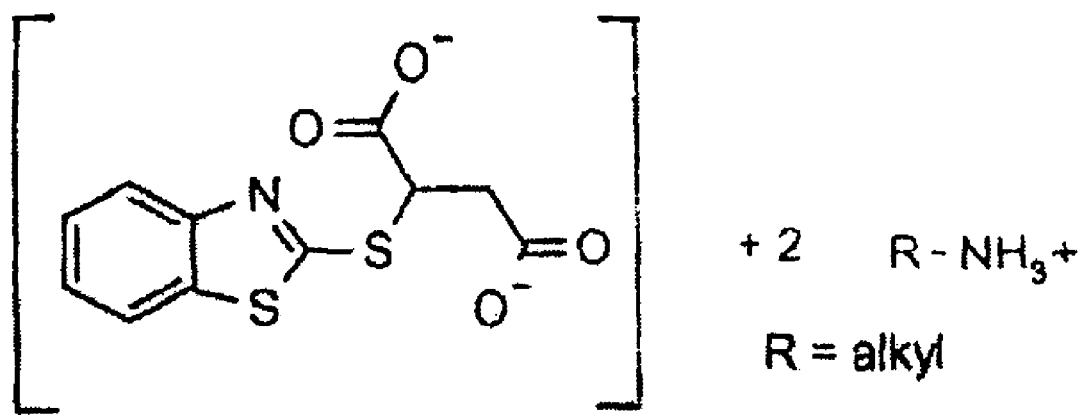
FIG. 4 is an illustration of the chemical formula of (2-benzothiazolylthio) succinic acid amine complex.

In another embodiment, the invention provides for a fastener coated with a coating material containing a corrosion resistant composition consisting essentially of approximately 4% by weight of a salt of inorganic constituents formed from cations selected from the group consisting of zinc and calcium, and anions selected from the group consisting of silicates, phosphates, carbonates and oxides, and is available from Wayne Pigment Corporation, Milwaukee, Wis., such as under the trade name Wayncor 204, for example, as noted above; approximately 4% by weight of 1-(Benzothiazol-2-ylthio) succinic acid, (BTTSA), available from CIBA under the trade name IRGACOR 252, as noted above; and approximately 4% by weight of (2-benzothiazolylthio) succinic acid (BTTSA) amine complex, the chemical formula of which is illustrated in FIG. 4, available from CIBA under the trade name IRGACOR 153. These components are suspended in a phenol-formaldehyde thermosetting resin which forms the remainder of the corrosion resistant composition, and which may include other ingredients. The remainder may, for example, further include a pigment such as molybdenum disulfide, aluminum, polypropylene, or combinations thereof. The corrosion resistant composition typically is dissolved in a volatile solvent carrier, as noted above.

The inorganic constituents should have a particle size of 10 microns or less where coating thicknesses must be controlled to less than 0.0001 inch, as in the case of many fasteners. The pigments should be milled into the coating material according to standard milling techniques.

In each of the foregoing embodiments, the corrosion inhibiting constituents are suspended in a phenol-formaldehyde thermosetting resin, which is dissolved in a volatile solvent carrier giving the mixture a liquid consistency but providing fast drying after application. The mixture should be mixed thoroughly and uniformly according to standard paint mixing techniques. The solvent may be a lower alkyl alcohol such as methyl, ethyl, propyl or isopropyl alcohol or a similar solvent such as methyl, ethyl ketone or a petroleum distillate in the volatile solvent range such as xylene or toluene, or mixtures of two or more of these solvents. For many applications polytetrafluoroethylene, which is available under the trademark TEFLON from DuPont, may also be included in the coating material. For special applications, a cation-type wetting agent such as fatty amido diamine, may be included.

The ratio of the corrosion inhibiting constituents to the mixture of resin and solvent can range from about 3 to 15 percent by weight. Where polytetrafluoroethylene is used it can range from about 1 to 40 percent by weight of the mixture of the resin and solvent. The amount of solvent carrier used should be sufficient to provide a desired degree of liquidity, depending somewhat on whether it is to be applied by spraying, dipping or brushing, or the like.

Where the coating is to be applied to steel or alloy steel parts it will usually be desirable to use a cation-type wetting agent such as fatty amido diamine in the mixture, as the introduction of fatty amido diamine results in a coating which exhibits superior corrosion resistance particularly in the presence of salt spray. This coating can be applied to high-temperature tool steels and alloy steels and will afford such steels superior corrosion protection.

A preferred manner for applying the coating material is by spraying, although either dipping or brushing can be used instead. Because of the volatility of the carrier solvent, it dries and solidifies quickly. The coating is baked after application to a fastener. It has been found that in the application of the coating material to a fastener the thickness of the solidified coating on the fastener can be held to between 0.0002 and 0.0005 inch. This thickness control is important and desirable particularly in the case of threaded fasteners to insure proper thread fit and in the case of aircraft quality interference or non-interference type fasteners. Interference-fit fasteners are commonly made by making their diameters slightly greater than that of the hole through the structural member to which it is to be fastened. Forcing such a fastener through a hole for the fastener typically causes abrasion of the coated surface of the fastener. It has been found that the corrosion resistant coating applied according to this invention is sometimes capable of lubricating the fastener to resist the abrasion and assist in maintaining adherence of the coating to the fastener.

EXAMPLES

Various corrosion resistant coatings were formulated with a basic carrier formulation of a phenolic resin, used in a solution of ethyl alcohol, and rendered less brittle by addition of polyvinyl butyral and di-octyl phthalate (DOP), to which the different corrosion inhibitors and pigments were added. Various other additives were used, such as polytetrafluoroethylene to serve as a lubricant, and powdered aluminum to serve as a pigment. The corrosion resistant coatings were used to coat titanium fasteners, which were inserted in an aluminum block to form an assembly. Each assembly was subjected to alternate immersion cycles in a 3.5% sodium chloride aqueous solution for 1,000 hours. Each cycle consisted of immersing the assembly in the sodium chloride salt solution for 10 minutes, removing the assembly, and subjecting the assembly to forced air drying for 50 minutes. The testing was run at an ambient temperature of 75° Fahrenheit. The results of the alternate immersion screening tests are shown in the table below. The results are given on a numerical scale of from 0 to 10, where 0 is no protection at all, corresponding to an uncoated fastener, and 10 is a level of nearly complete protection, as is found with a coating containing hexavalent chromium compounds.

RESULTS OF ALTERNATE IMMERSION TESTS

| Corrosion Inhibitor | % Inhibitor Used | Corrosion Results |
|---|---|---|
| strontium chromate | 2.5 | 10 |
| salt mixture - WAYNCOR 204 | 5 | 5 |
| BTTSA - IRGACOR 252 | 5 | 3 |
| BTTSA amine complex - IRGACOR 153 | 5 | 3 |
| salt mixture and BTTSA | 3 + 3 | 4 |
| salt mixture and BTTSA amine complex | 3 + 3 | 4 |
| salt mixture and BTTSA | 8 + 8 | 8+ |
| salt mixture, BTTSA, and BTTSA amine complex | 4 + 4 + 4 | 9+ |
| None | — | 0 |

Although the coatings described herein have been described with particular reference to use as coatings for fasteners, the coatings are not limited to fasteners but may be applied generally to other surfaces requiring corrosion protection and lubrication, such as high-temperature tool steel or other parts made of alloy steel. Likewise it is not always necessary to apply coatings as thin as those which will ordinarily be applied to fasteners, and thicker coatings may be used for other applications.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In a fastener having an exterior coating containing a corrosion resistant composition, the improvement wherein said corrosion resistant composition comprises:
   approximately 8% by weight of the total weight of the composition of a salt of inorganic constituents formed from cations of calcium, and anions selected from the group consisting of, carbonates and oxides;
   approximately 8% by weight of the total weight of the composition of 1-(Benzothiazol-2-ylthio) succinic acid; and
   said salt of inorganic constituents having a particle size of 10 microns or less, and said salt of inorganic constituents and said 1-(Benzothiazol-2-ylthio) succinic acid being suspended in a remainder comprising a mixture of phenol-formaldehyde thermosetting resin, polyvinyl butyral and di-octyl phthalate.

2. The fastener according to claim 1, wherein said remainder further comprises fatty amido diamine.

3. The fastener according to claim 1, wherein said remainder further comprises polytetrafluoroethylene.

4. The fastener according to claim 1, wherein said remainder further comprises a pigment selected from the group consisting of molybdenum disulfide, aluminum, polypropylene, and combinations thereof.

5. The fastener according to claim 1, wherein said corrosion resistant composition is dissolved in a volatile solvent carrier, and the exterior coating of the fastener is dried and baked.

6. In a fastener having an exterior coating containing a corrosion resistant composition, the improvement wherein said corrosion resistant composition comprises:

approximately 4% by weight of the total weight of the composition of a salt of inorganic constituents formed from cations of calcium, and anions selected from the group consisting of carbonates and oxides;

approximately 4% by weight of the total weight of the composition of 1-(Benzothiazol-2-ylthio) succinic acid;

approximately 4% by of the total weight of the composition weight of (2-benzothiazolylthio) succinic acid amine complex; and said salt of inorganic constituents having a particle size of 10 microns or less, and said salt of inorganic constituents, said 1-(Benzothiazol-2-ylthio) succinic acid, and said (2-benzothiazolylthio) succinic acid amine complex being suspended in a remainder comprising a mixture of phenol-formaldehyde thermosetting resin, polyvinyl butyral and di-octyl phthalate.

7. The fastener according to claim 6, wherein said remainder further comprises fatty amido diamine.

8. The fastener according to claim 6, wherein said remainder further comprises polytetrafluoroethylene.

9. The fastener according to claim 6, wherein said remainder further comprises a pigment selected from the group consisting of molybdenum disulfide, aluminum, polypropylene, and combinations thereof.

10. The fastener according to claim 6, wherein said corrosion resistant composition is dissolved in a volatile solvent carrier, and the exterior coating of the fastener is dried and baked.

* * * * *